(12) United States Patent
Medynski et al.

(10) Patent No.: US 7,980,813 B2
(45) Date of Patent: Jul. 19, 2011

(54) FAN OUTLET GUIDE VANE SHROUD INSERT REPAIR

(75) Inventors: Andrew W. Medynski, San Antonio, TX (US); Ronald N. Zappone, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1009 days.

(21) Appl. No.: 11/891,815

(22) Filed: Aug. 13, 2007

(65) Prior Publication Data

US 2009/0047122 A1     Feb. 19, 2009

(51) Int. Cl.
*F01D 5/10*     (2006.01)

(52) U.S. Cl. ..... 415/119; 415/191; 415/200; 415/209.1; 415/209.2; 415/209.3; 29/889.22

(58) Field of Classification Search .................. 415/119, 415/191, 200, 209.1, 209.2, 209.3; 29/889.22
See application file for complete search history.

(56) References Cited

U.S. PATENT DOCUMENTS

| | | | | |
|---|---|---|---|---|
| 4,655,682 A | * | 4/1987 | Kunz et al. | 415/119 |
| 5,074,752 A | * | 12/1991 | Murphy et al. | 415/209.4 |
| 5,083,900 A | * | 1/1992 | Carletti et al. | 415/209.3 |
| 5,494,404 A | * | 2/1996 | Furseth et al. | 415/209.3 |
| 5,765,993 A | * | 6/1998 | Weiss | 415/209.2 |
| 6,619,917 B2 | * | 9/2003 | Glover et al. | 415/209.3 |

* cited by examiner

*Primary Examiner* — Igor Kershteyn
(74) *Attorney, Agent, or Firm* — Kinney & Lange, P.A.

(57) ABSTRACT

A method of repairing a turbine engine component that contains a series of lined apertures. The component is removed from the engine, and then at least one of the aperture liners is also removed. The area adjacent the aperture is machined to remove a portion of the parent material of the component. An insert which replaces the material removed by machining is secured adjacent the aperture. The liner about the aperture is then replaced.

12 Claims, 7 Drawing Sheets

FAN OUTLET GUIDE VANE SHROUD INSERT REPAIR

BACKGROUND

The present invention relates to the repair of turbine engine components, and in particular to the repair of the outlet guide vane shroud assembly. The repair addresses worn vane location slots within the outlet guide vane shroud assembly.

During operation of a turbine engine, the engine components can be damaged. Engine operating stresses frequently lead to fatigue cracks or similar defects in gas turbine engine parts. Repairs must be done to the defects caused during normal operation. One part that may require repair is the outlet guide vane shroud assembly, which is the inner part of the fan frame assembly. Specifically, the shroud assembly contains vane location slots for affixing vanes within the assembly. The vane location slots support the inner end of the fan guide vanes. The shroud assembly also acts as a case to create the inner wall for secondary air flow through the engine.

An insert is located between the fan guide vane and the shroud casing. This insert is meant to be a wear part, and can be replaced. However, during engine operation, the inserts may wear to a point where the vane location slots are in contact with the fan guide vanes. The contact may result in the slots becoming oversized, which results in a less than optimal support structure for the fan guide vanes. Upon reaching a limit outside of acceptable tolerances, the fan outlet guide vane inner shroud assembly must be removed from service. Currently, there is a high scrap rate of the part due to a lack of repair for this distress mode, and the cost of replacing the part is expensive. Therefore, what is needed is a repair that eliminates the need for total part replacement.

SUMMARY

Disclosed in one embodiment is a fan guide vane shroud assembly for a gas turbine engine. The assembly has a shroud ring that contains a plurality of substantially equally spaced apertures, along with at least one insert attached to at least one of the shroud ring apertures, and a plurality of polymer liners about each of the shroud ring apertures. The insert has substantially similar properties as the shroud ring.

In a second embodiment, a method of repairing a turbine engine component that contains a series of lined apertures is disclosed. First, the component is removed from the engine, and then at least one of the aperture liners is also removed. Next, the area adjacent the aperture is machined to remove a portion of the parent material of the component. An insert is secured adjacent the aperture to replace the material removed by machining. Finally, the liner about the aperture is replaced.

DETAILED DESCRIPTION

Figure 1:
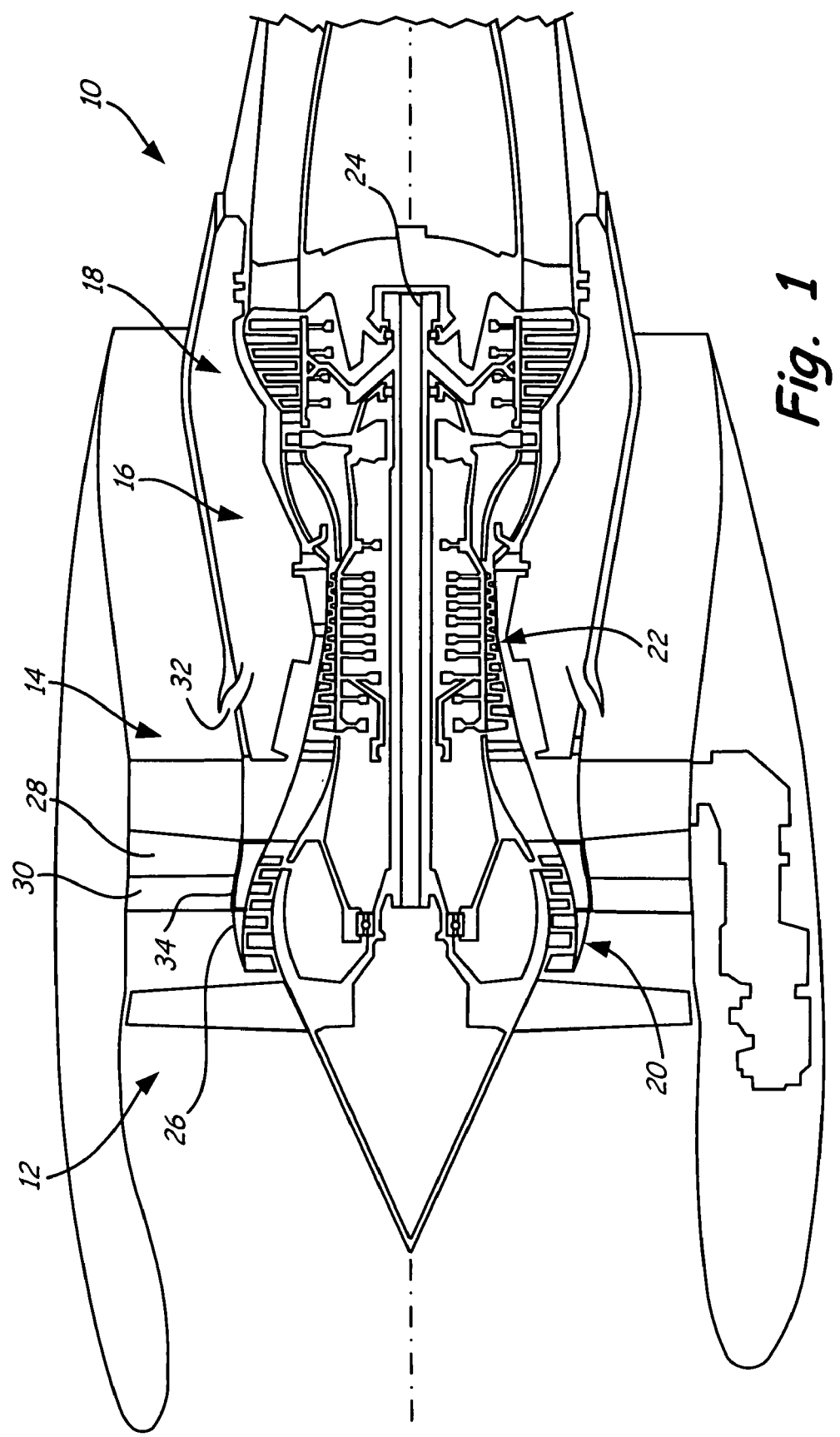
FIG. 1 is a cross-sectional view of a gas turbine engine.

FIG. 1 is a cross-sectional view of a gas turbine engine 10, which has inlet fan 12, compressor section 14, combustion section 16, and turbine section 18. Compressor section 14 has low pressure compressor 20 and high pressure compressor 22. Air is taken in through fan inlet 12 and a portion is directed to compressor section 14. The air is then compressed by a series of rotating blades and vanes in the compressor section. The compressed air is mixed with fuel, and then ignited in combustion section 16. The combustion exhaust is then directed towards turbine section 18, which is also comprised of blades and vanes. The blades extract kinetic energy from the exhaust to turn shaft 24, which provides power output for the engine.

After air enters fan inlet 12, splitter fairing 26 directs a portion to low pressure compressor 20. The rest of the air flows through bypass duct 28 and is directed by fan guide vanes 30. The air directed to bypass duct 28 will be bled off through opening 32 to be used for cooling the components of high pressure compressor 14, combustion section 16, and turbine section 18. Fan guide vanes 30 are held in place by fan outlet guide vane shroud assembly 34.

Figure 2:
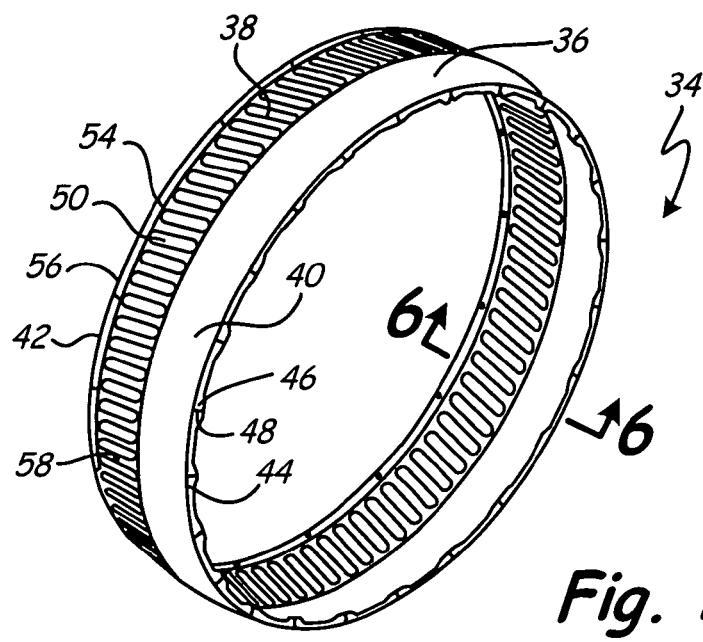
FIG. 2 is a perspective view of an outlet guide vane shroud assembly.

FIG. 2 is a perspective view of outlet guide vane shroud assembly 34. Outlet guide vane shroud assembly is comprised of shroud ring 36 and liners 38. Shroud ring 34 is generally cylindrical or frustaconical in shape, and has forward side 40 and aft side 42. Shroud ring 34 is fabricated from aluminum, or a similar light weight metal.

Forward side 40 has an inwardly extending flange 44. Flange 44 has several widened areas 46, each containing an aperture 48. Apertures 48 are used as fastener holes for securing outlet guide vane shroud assembly 34 to other engine casing components. Aft side 42 has a series of equally spaced slots 50. Each slot 50 contains liner 38, which is used to secure one fan guide vane 30. Liners 38 are constructed from a polymer, and may held in place with an adhesive. Aft side 42 also contains a series of apertures 54 between slots 50 and aft edge 56. Again, apertures. 54 are used for the insertion of fasteners to secure outlet guide vane shroud assembly 34 to other engine casing components. Between two slots 50 is borescope hole 58. Borescope hole 58 is a small aperture for the insertion of a borescope to inspect the various components of the engine.

During operation, one or more of the apertures may see the formation of a defect. Defects can include small cracks emanating from apertures 54, or a wearing of aperture 54 to a point where the aperture is out of an acceptable tolerance for the part. The wearing of apertures 54 from normal use of the turbine is common, and currently parts that exceed acceptable tolerances are scrapped.

Figure 3:
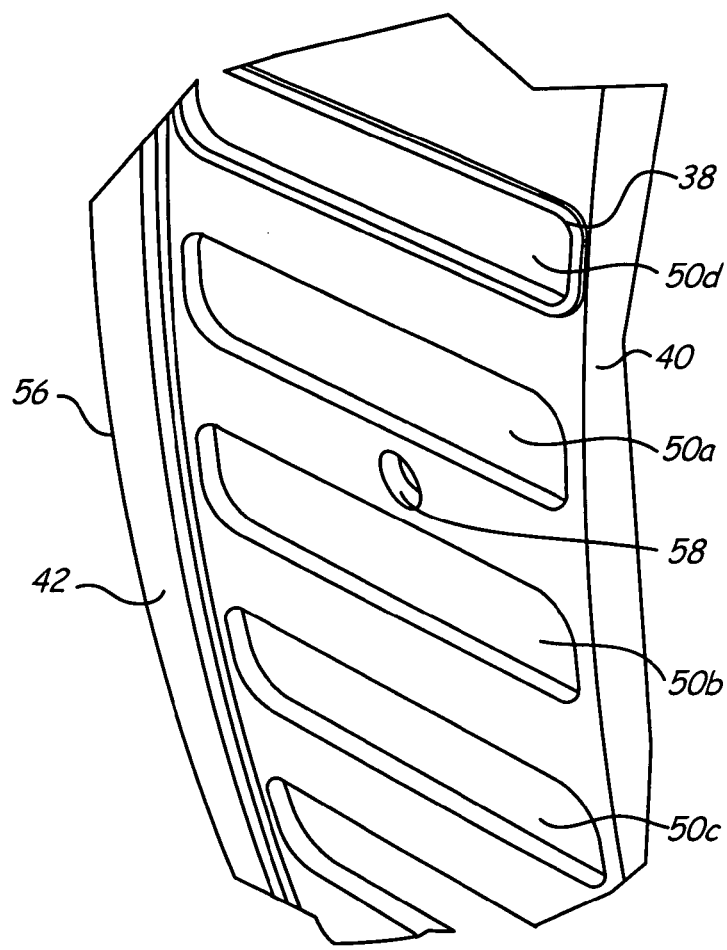
FIG. 3 is a magnified perspective view of a portion of the outlet guide vane shroud.

FIG. 3 is a magnified view of a portion of outlet guide vane shroud assembly 34. In this view, slot 50*d* contains liner 38, while the inserts have been removed from slots 50*a*-50*c*. Borescope hole 58 is located between slots 50*a* and 50*b*. The current repair method is not available for slots 50*a* and 50*b* adjacent borescope hole 58, but is available for the remaining slots (including 50*c* and 50*d*).

Figure 4:
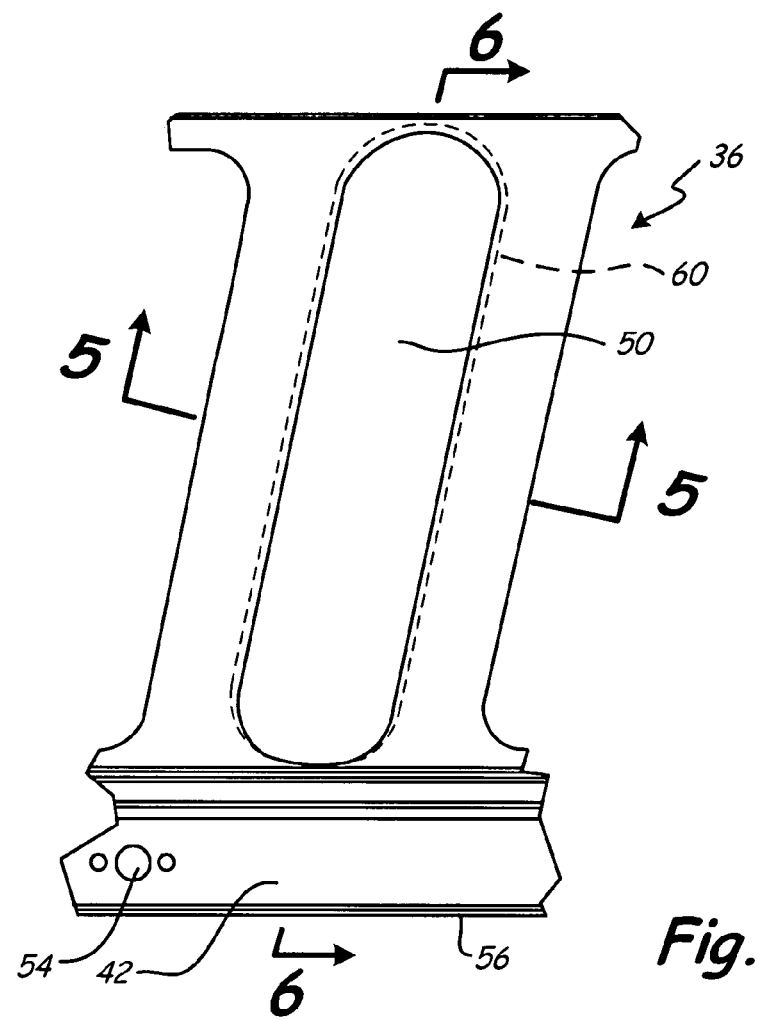
FIG. 4 is an elevation view of a portion of the outlet guide vane shroud ring.

FIG. 4 is an elevation view of a portion of the outlet guide vane shroud ring. Illustrated are slot 50, as well as aperture 54 adjacent aft edge 56 of aft side 42 of shroud ring 36. Liner 38 has been removed. To initiate the repair, the material of shroud ring 36 is removed adjacent slot 50 along line 60. The removal is accomplished through common material removal techniques, such as machining. In the embodiment illustrated, more material is removed opposite aft side 42 along line 60. In operation, the angular velocity and acceleration direct fan guide vanes 30 away from aft side 42 of shroud ring 30. Thus, it is more common to identify defects in this area, which results in the non-uniform removal of material along line 60 to remove any defects.

Figure 5:
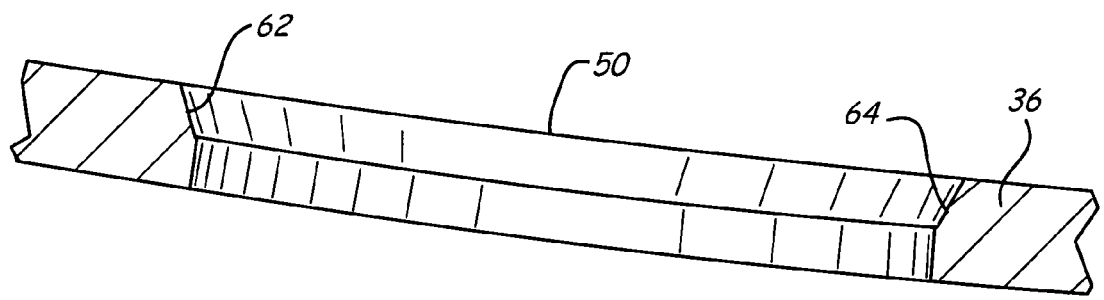
FIG. 5 is a cross-sectional view of the outlet guide vane shroud ring taken along line 5-5 illustrated in FIG. 4.
Figure 6:
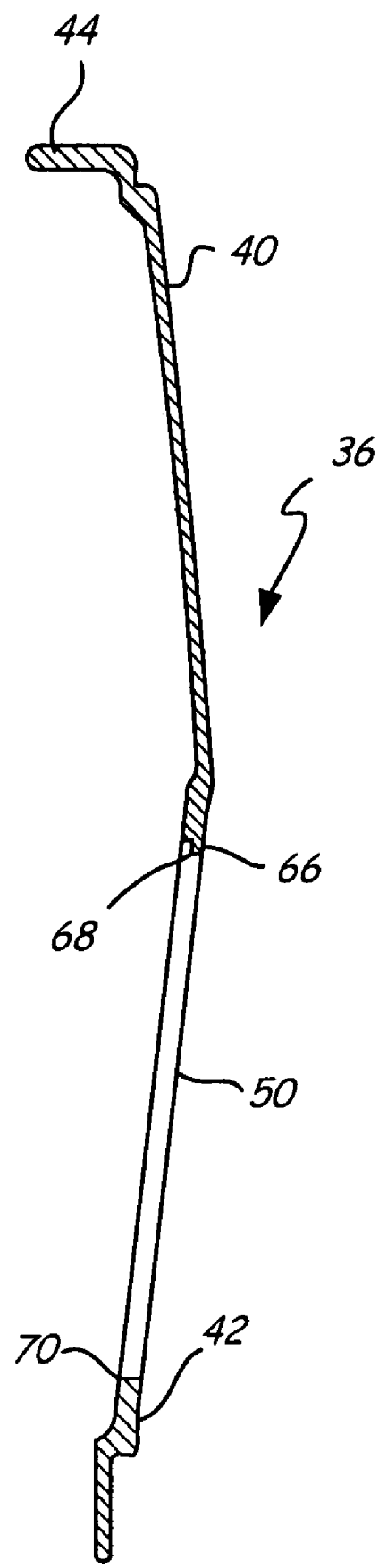
FIG. 6 is a cross-sectional view of the outlet guide vane shroud ring taken along line 6-6 in FIG. 4.

FIG. 5 is a cross-sectional view of shroud ring 36 taken along line 5-5 illustrated in FIG. 4. FIG. 6 is a cross-sectional view of shroud ring 36 taken along line 6-6 in FIGS. 2 and 4. In FIG. 5, parent material has been removed from shroud ring 36 adjacent slot 50. In this embodiment, the parent material is removed to leave beveled surfaces 62 and 64 on each side of slot 50. Parent material is material of shroud ring 36 that has previously been in service, and includes original as well as subsequent material added during prior repairs.

In FIG. 6, parent material has been removed also. The parent material has been removed and left step 66 on forward edge 68. Aft edge 70 is machined to contain a surface substantially parallel to the original surface of slot 50. The difference in material removal between forward edge 68 and aft edge 70 can be adjusted as required to assure removal of defects caused during normal engine operation.

Figure 7:
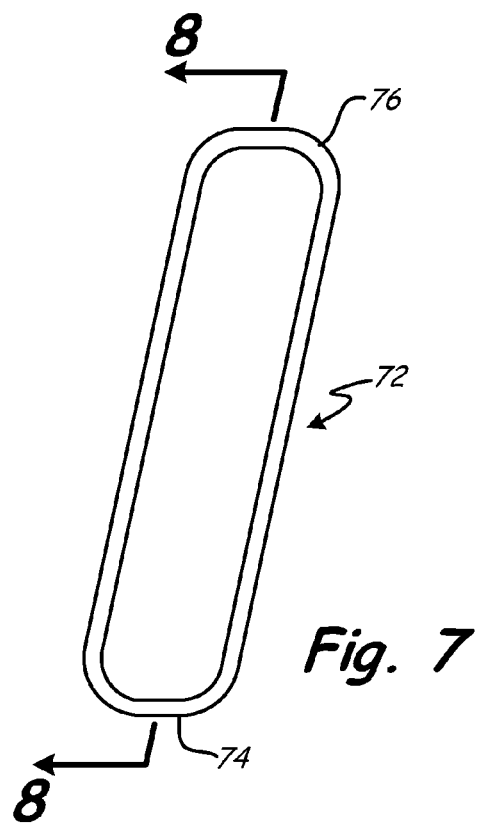
FIG. 7 is a plan view of a replacement insert for the outlet guide vane shroud assembly.
Figure 8:
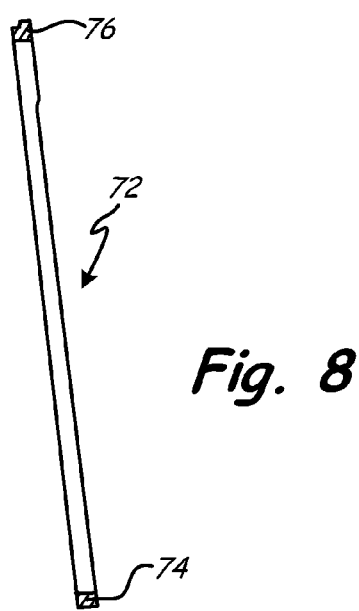
FIG. 8 is a cross-sectional view of the insert taken along line 8-8 in FIG. 7.

FIG. 7 is a plan view of replacement insert 72 for insertion into shroud ring 36. FIG. 8 is a cross-sectional view of the insert taken along line 8-8 in FIG. 7. Replacement insert 72 is manufactured from the same or similar material as shroud ring 36. In one embodiment, insert 72 contains the same metallurgical properties as shroud ring 36, and is made by casting. In other embodiments, insert 72 is made by forging, or machining a piece of raw material to the specifications for insert 72.

Insert 72 is illustrated as containing a generally uniform cross-section on first end 74, and has a stepped cross-section at second end 76. This configuration allows for a mating of insert 72 into refurbished slot 50 as illustrated in FIG. 6. Although illustrated as containing a graduated step from first end 74 to second end 76, insert 72 may contain other geometries for the edges including bevels (to mate with the embodiment shown in FIG. 5), chamfers, tapers, radii, or similar shapes that may be either graduated or of a constant cross-sectional area throughout the profile of insert 72.

Figure 9:
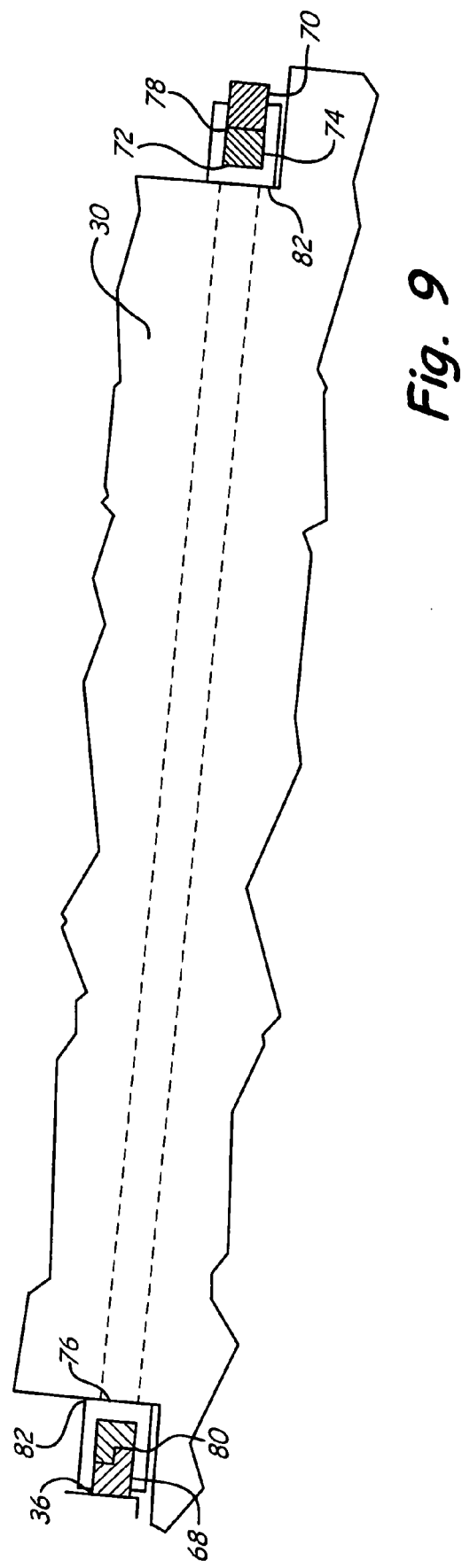
FIG. 9 is a cross-sectional view of the insert joined to the outlet guide vane shroud.

FIG. 9 is a partial cross-sectional view of insert 72 joined to shroud ring 36 with liner 82 and fan guide vane 30. As illustrated, first end 74 of insert 72 is mated to aft edge 70 of shroud ring 36 at joint 78. Similarly, second end 76 of insert 72 is mated to forward edge 68 of shroud ring 36 at joint 80. Joint 80 is a stepped or rabbet joint, while joint 78 is a butt joint. Insert 72 is secured to shroud ring 36 through any of various methods, including interference fit, adhesives, welding, or similar attachment methods. In an alternate embodiment, insert 72 is secured in place once liner 82 has been installed in fan outlet guide vane shroud assembly 24. Although illustrated with a varying or non-uniform cross section, in alternate embodiments insert 72 contains a uniform or substantially uniform cross sectional area.

Liner 82 is a polymer insert used to position a fan guide vane within slot 50. Liner 82 may be a previously used insert, such as liner 38 illustrated in FIG. 3, or may be a new part. Liner 82 contains a generally uniform cross section. As illustrated, liner 38 covers insert 72. In one embodiment, the liner is used to hold the insert in place.

With the aforementioned structures, a repair procedure is applicable to worn vane location slots of a fan outlet guide vane inner shroud assembly. The repair will work for most slots within a fan outlet guide vane inner shroud assembly. The repair may not work for the slots adjacent borescope holes, or similar structures in the shroud ring.

Figure 10:
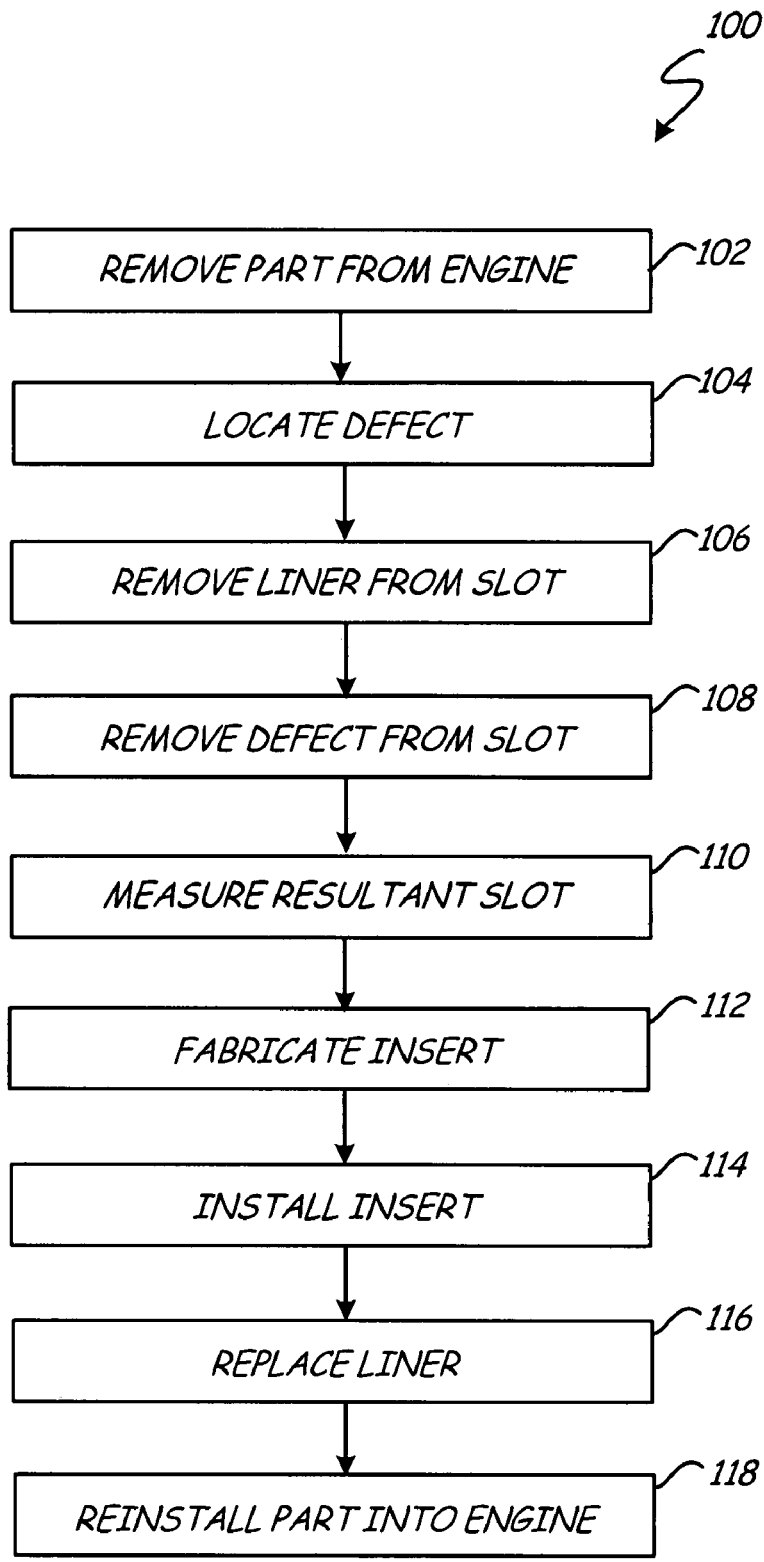
FIG. 10 is a flow diagram of a repair process for the outlet guide vane shroud assembly.

FIG. 10 is a flow diagram of a repair process 100 for outlet guide vane shroud assembly 34. To initiate the repair process, the fan guide vane shroud assembly 34 is removed from the engine, Box 102. The shroud ring and liners are isolated. As depicted in Box 104, defects are identified. Defects may refer to cracks, chips, or other readily ascertainable deformations of the shroud ring, or a slot that is no longer within recommended dimensional tolerances from ordinary wear due to engine operation. Liner 38 of slot 50 to be repaired is removed from shroud ring 36, Box 106.

A center location of the slot is established. This position is verified by measuring of dimensions of the slot in both the generally axial and generally circumferential directions of the part. The term "axial" and "circumferential" relate to dimensions using the center axis of the engine as the base reference. Measurements are preferably taken from unworn portions of the surface of the slot.

Next, the area adjacent shroud slot 50 is machined to remove defects, Box 108, while at the same time maintaining clearance required for assembly. After machining, the part may be put through a finishing process, such as deburring or breaking edges.

The resultant aperture is measured, i.e. the new slot dimensions are taken, Box 110, and the resultant measurements are used to create an insert. In one embodiment, the insert is locally fabricated from a material that contains similar properties as the base material of the shroud ring, Box 112. As depicted in Box 114, insert 72 is installed. Insert 72, once installed, will return the aperture to acceptable tolerances just as if the part were original. In an alternate embodiment, insert 72 is prefabricated and slot 50 is machined to meet the outer dimensions of the prefabricated insert.

The dimensions from outer surface of the shroud wall to inner surface of the insert are verified prior to final assembly. This allows adjustment of dimensions, if necessary to meet specification requirements. The locally machined area and new locally manufactured insert are inspected to assure no defects are present, or remain from prior to initiating the repair.

Shroud ring 36 is prepared for insert 72 installation by using an adhesive that develops a high strength bond, and permanently keeps insert 72 in a pre-machined shroud slot. In one embodiment, the adhesive is a two component adhesive/sealant. For example, the adhesive may be a polysulfide rubber, which comes in two separate components that are combined just prior to or during application. Polysulfide rubber is typically used as an adhesive or sealant in a temperature range of −55° C. to 85° C. In one embodiment, the adhesive and insert 72 are joined in a clean environment, such as a bonding room. This will assure the proper temperature and humidity for curing the adhesive. The tools used, as well as shroud 36 and insert 72, are cleaned. The clean environment should be free from silicones, oils, dusts, or other contaminants harmful to sound bonds. In order to maintain required strength, fit of insert 72 in shroud slot 50 must be maintained as required per specification, and verified prior to assembly. Shroud ring 36 may be masked to assure the placement of the adhesive only onto the bonding surfaces of shroud ring 36 and insert 72.

In addition to the use of adhesives, the insert may also be held in place through a shrink fit or interference fit. Further, in addition to the adhesive, an adjuvant for the adhesive's chemical composition may be utilized. For example, a water-based, air drying adhesion promoter in liquid form is applied and allowed to cure at room temperature for at least 30 minutes prior to application of the polysulfide rubber adhesive. In one embodiment, the adhesive is placed at predetermined areas, which assures flush surfaces between the shroud and insert. Outside pressure may be applied to the joint after the adhesive is applied to squeeze out adhesive and assure proper filling of the joint. The adhesive is allowed to cure, and then excess material is removed through common manufacturing techniques. In the exemplary embodiment where a polysulfide rubber adhesive is used, the polysulfide rubber will cure at a temperature of about 57° C.±10° C. for a minimum of four hours. The excess polysulfide adhesive will be removed by mechanical means, such as by a gloved finger or rag prior to the curing process, or with a razor blade or similarly sharp tool after the curing process.

After installation of the insert into the shroud ring, the surfaces are treated and finished to create a smooth part. This includes the removal of excess material from the insert and any excess adhesive. The part is then finally inspected to assure the part meets specified dimensions, no excess material or adhesive residue is present on the part, and that there are no defects in the joint.

In an alternate embodiment, insert 72 is joined to shroud ring 36 through the use of a welding process or other known manufacturing method of joining two parts.

After shroud ring 36 and insert 72 have been joined, the aperture liner is reinstalled, Box 116. In one embodiment, liner 38 has been previously used in service, while in another embodiment, liner 82 is a new part. Shroud ring 36 is then reinstalled into the engine to complete the repair, Box 118.

The aforementioned repair process results in a quick, more economical repair than replacing the existing part. Numerous slots may be repaired at the same time, and the repair may be utilized for the same slot several times provided enough base material is left in the shroud ring to allow for the subsequent repair.

Although the present invention has been described with reference to preferred embodiments, workers skilled in the art will recognize that changes may be made in form and detail without departing from the spirit and scope of the invention.

The invention claimed is:

1. A method of repairing a turbine engine component containing a series of lined apertures, the method comprising:

removing the component;
   removing at least one of the aperture liners;
   machining adjacent the aperture to remove a portion of parent material of the component;
   securing an insert adjacent the aperture to replace the material removed by machining; and
   replacing the aperture liner.

2. The method of claim 1 wherein the insert is comprised of a material containing the same properties as the turbine engine component.

3. The method of claim 1 wherein the insert contains a varying cross-sectional area.

4. The method of claim 1 further comprising:
   inspecting the insert and component.

5. The method of claim 1 wherein securing the insert comprises using an adhesive.

6. The method of claim 1 wherein replacing the liner comprises inserting a new liner.

7. A method of repairing a fan guide vane shroud assembly, the method comprising:

removing a shroud ring containing a series of slots;
   removing a portion of parent material of the shroud ring adjacent at least one slot contained within the shroud ring;
   fabricating an insert based on an amount of parent material removed;
   securing an insert within the machined slot to replace the removed parent material; and
   replacing the shroud ring.

8. The method of claim 7 further comprising:
   removing a liner adjacent at least one slot contained within the shroud ring before removing the parent material.

9. The method of claim 8 further comprising:
   replacing the liner after the insert is secured.

10. The method of claim 7 wherein securing the insert comprises:
    applying an adhesive to the joint between the shroud ring and the insert;
    applying pressure to the joint; and
    curing the adhesive in the joint.

11. The method of claim 7 wherein the insert contains a varying cross-sectional area.

12. The method of claim 7 further comprising:
    preparing the shroud ring for joining to the insert after removal of the parent material;
    removing excess any material after securing the insert; and
    inspecting the joined shroud ring and insert.

* * * * *